UNITED STATES PATENT OFFICE.

ROBERT ATHELSTAN MARR, OF NORFOLK, VIRGINIA.

PROCESS OF PRODUCING TEXTILE FIBERS.

1,362,723.  Specification of Letters Patent.  Patented Dec. 21, 1920.

No Drawing. Application filed March 26, 1917, Serial No. 157,552. Renewed May 10, 1920. Serial No. 380,399.

*To all whom it may concern:*

Be it known that I, ROBERT A. MARR, a citizen of the United States, residing at Norfolk, in the county of Norfolk and State of Virginia, have invented certain new and useful Improvements in Processes of Producing Textile Fibers, of which the following is a specification.

The present invention relates to the production of textile fibers, that is to say fibers suitable for use in the manufacture of fabric or bagging; also suitable for making yarns, cordage, twine and similar materials, from plant growth, particularly such materials as sedges, junca, typhæ, rushes, reeds, pita, cane, bamboo, yucca, petioles of banana stock, pineapple leaves and other marsh growth. In treating these materials, it is preferable to employ the same in a green state, that is to say directly after cutting, and without previously drying the same. However in some instances it may be advisable to dry the same somewhat, but a somewhat longer time will be required when using dry material.

In carrying out my process I place the material in a digester, which may be unlined, it being unnecessary to provide a lining of acid-resistant brick or other material, such as is commonly used in the sulfite paper process. The material as above specified and the cooking solution are introduced into the digester, and the preferred cooking solution consists of a solution of zinc sulfate, about 2 ounces per gallon, together with which I preferably employ an addition of paraffin oil, for example about 16 ounces of such oil for 100 gallons of the cooking liquor.

The material is then cooked, preferably under pressure, and with the materials in a green state, about 30 minutes, with a pressure of 30 to 40 pounds per square inch is sufficient. With dried material, and with this same pressure a time of 40 to 50 minutes is preferable. The time and pressure are both materially less than would be required if the object were to produce paper pulp, in which case about 45 minutes boiling with a pressure of 90 to 100 pounds would be required.

The digestion is approaching completion, when the liquor begins to give off a caromel odor, although the material under treatment has not broken up to any material extent.

After cooking the material goes to a picker, such as a mixed rag or wool picker, for the separation of the material which in the raw plant material holds the fiber bundles together. The material is delivered from the picker to a traveler of wire mesh and is washed with sprays of water. It is then passed through a drying room and comes out ready for carding into rove, and is then spooled and twisted for weaving into bagging or cordage, or it can be baled for shipment, etc.

The treatment of the vegetable material with the liquor in question renders the cementitious material soluble in water, converts this into substances which will be washed out with water, after which, during the washing operation, the water dissolves out the starches and sugars, but not the non-fibrous cellulose, such as the pecto-cellulose, ligno-cellulose, cuto-cellulose and the like.

Without limiting myself to the use of any particular quality of oil, I find that a hydrocarbon oil distillate from Pennsylvania crude oil, having a specific gravity of about .87 to .9 gives good results.

What I claim is:

1. A process of producing textile filamentous fibers which comprises digesting plant growth containing fibrous material with a solution containing a soluble salt of the metal zinc, and carrying the digestion only to a point short of attacking any material amount of the cementing agents which hold the fibers into filaments.

2. A process of treating fibrous plant growth containing fibrous material, which comprises heating the same with a solution containing a salt of the metal zinc and a hydrocarbon oil until a portion of the non-fibrous cementing materials contained therein are attacked by said solution and rendered soluble.

3. A process of producing textile filamentous fibers which comprises digesting plant growth containing fibrous material with a solution containing about 2% of zinc sulfate and a small quantity of a hydrocarbon oil softening material, and carrying the digestion only to a point short of attacking any material amount of the cementing agents which hold the fibers into filaments.

In testimony whereof I affix my signature.

ROBERT ATHELSTAN MARR,